(12) United States Patent
Lee et al.

(10) Patent No.: US 9,414,220 B2
(45) Date of Patent: Aug. 9, 2016

(54) METHOD FOR MANAGING MULTIPLE PROFILES IN AN EMBEDDED UICC, AND EMBEDDED UICC AND TERMINAL THEREFOR

(71) Applicant: KT CORPORATION, Seongnam-si (KR)

(72) Inventors: Jin Hyoung Lee, Seoul (KR); Yeu Min Yoon, Seoul (KR); Youn Pil Jeung, Seoul (KR)

(73) Assignee: KT CORPORATION, Seongnam-si (KR)

( * ) Notice: Subject to any disclaimer, the term of this patent is extended or adjusted under 35 U.S.C. 154(b) by 133 days.

(21) Appl. No.: 14/356,089

(22) PCT Filed: Nov. 1, 2012

(86) PCT No.: PCT/KR2012/009129
§ 371 (c)(1),
(2) Date: May 2, 2014

(87) PCT Pub. No.: WO2013/066077
PCT Pub. Date: May 10, 2013

(65) Prior Publication Data
US 2014/0308991 A1    Oct. 16, 2014

(30) Foreign Application Priority Data

Nov. 4, 2011  (KR) .................. 10-2011-0114765
Nov. 1, 2012  (KR) .................. 10-2012-0122793

(51) Int. Cl.
*H04W 8/20*      (2009.01)
*H04W 8/18*      (2009.01)
(Continued)

(52) U.S. Cl.
CPC ................ *H04W 8/20* (2013.01); *H04W 4/003* (2013.01); *H04W 8/18* (2013.01); *H04W 8/183* (2013.01); *H04W 8/205* (2013.01); *H04B 1/3816* (2013.01); *H04W 4/005* (2013.01); *H04W 12/04* (2013.01)

(58) Field of Classification Search
CPC ..... H04W 12/06; H04W 12/08; H04W 12/04; H04W 12/02; H04W 12/10; H04W 8/183; H04W 12/12; H04W 8/18; H04W 12/00; H04W 8/205; H04W 8/20; H04W 4/003; H04W 4/005; H04B 1/3816; H04M 1/72522; H04M 1/66; H04L 63/0853; H04L 63/20; H04L 67/306; H04L 9/0891
USPC ......... 455/410–411, 412.1, 558, 556.1, 556.2
See application file for complete search history.

(56) References Cited

U.S. PATENT DOCUMENTS 8,843,179 B2 *    9/2014  Li ........................... H04W 8/20
                                                    455/410
2003/0105832 A1 *  6/2003  Kaneko ................. H04L 63/083
                                                    709/217

(Continued)

FOREIGN PATENT DOCUMENTS

KR    10-2010-0072305 A    6/2010

OTHER PUBLICATIONS

"UICC in LTE: Guidance from SIMalliance", Whitepater version2 (SIM Alliance), Feb. 11, 2011, pp. 1-8.

(Continued)

*Primary Examiner* — Magdi Elhag
(74) *Attorney, Agent, or Firm* — Sughrue Mion, PLLC

(57) ABSTRACT

The present invention relates to a technology for managing profiles in an eUICC embedded in a terminal, and more particularly, to a method for efficiently managing profiles in an eUICC in consideration of a case in which multiple profiles are able to be stored in the eUICC, as well as to an embedded eUICC and terminal therefor.

13 Claims, 10 Drawing Sheets

(51) Int. Cl.
*H04W 4/00* (2009.01)
*H04B 1/3816* (2015.01)
*H04W 12/04* (2009.01)

(56) References Cited

U.S. PATENT DOCUMENTS

2010/0185874 A1 7/2010 Robles et al.
2010/0197350 A1* 8/2010 Jeung .................... H04W 8/183
455/558
2012/0135710 A1* 5/2012 Schell .................. G06F 12/0246
455/411
2014/0228039 A1* 8/2014 Zhao .................... H04B 1/3816
455/450

OTHER PUBLICATIONS

International Search Report of PCT/KR2012/009129 dated Mar. 22, 2013.

* cited by examiner

METHOD FOR MANAGING MULTIPLE PROFILES IN AN EMBEDDED UICC, AND EMBEDDED UICC AND TERMINAL THEREFOR

TECHNICAL FIELD

The present invention relates to a technology for managing a plurality of profiles in an Embedded Universal Integrated Circuit Card (hereinafter, referred to as 'eUICC') embedded in a terminal,

BACKGROUND ART

An Universal Integrated Circuit Card (UICC) is a smart card which can be used as a module for authentication of a user as inserted in a terminal. The UICC may store personal information of a user and operator information about a Mobile Network Operation (MNO) which the user subscribes to. For example, the UICC may include an International Mobile Subscriber Identity (IMSI) identifying the user. Also, the UICC may be referred to as a Subscriber Identity Module (SIM) card for Global System for Mobile communications (GSM), or a Universal Subscriber Identity Module (USIM) card for a Wideband Code Division Multiple Access (WCDMA).

When a user inserts a UICC into a terminal of the user, authentication of the user can be automatically performed by using the information stored in the UICC so that the user can conveniently user the terminal. Also, when a user desires to substitute an old terminal with a new terminal, the user can easily substitute the old terminal with the new terminal by inserting a UICC removed from the old terminal into the new terminal.

When terminals which are required to be miniaturized, for example, terminals for Machine-to-Machine (M2M) communications, are manufactured as having a structure for removable UICC, it becomes difficult to miniaturize the terminals. Therefore, an embedded UICC (eUICC), a non-removable UICC has been proposed. Information about a user using the eUICC is stored in the UICC in a form of IMSI.

Since a conventional UICC is implemented as a removable card, a user can open a terminal without a limit to types of terminals or MNOs. However, an IMSI in the eUICC of a terminal can be assigned when the terminal is used only for a specific mobile network operator designated in the manufacturing step of the terminal. Thus, a MNO placing an order for terminals and a manufacturer of the terminals should consider a stock inventory of manufactured terminals, and which becomes a reason of increasing sale prices of terminals. Also, users have inconveniency in changing a mobile network operator to which they subscribe to. Therefore, demanded is a method of opening a terminal by a user without regard to a mobile network operator of his terminal.

On the other hand, according to the recent introduction of the eUICC, it becomes necessary to update information about subscribers of various mobile network operators in a UICC remotely. Accordingly, a Subscription Manager (SM) or a Profile Manager (PM) for management of information about subscribers is being discussed.

Meanwhile, a plurality of operational profiles of MNOs may exist within an eUICC in application and data forms. However, at a time, only one active operational profile exists within the eUICC. At this time, the rest of operation profiles may be inactive operational profiles. In this case, two problems causing performance degradation may exist potentially.

DISCLOSURE

Technical Problem

The present invention provides a method for managing a plurality of profiles in an eUICC efficiently.

The present invention also provides a method for making a plurality of profiles be used efficiently when a plurality of profiles can be stored in an eUICC.

The present invention also provides a method for managing a plurality of profiles in an eUICC efficiently by managing data (common data) commonly used by a plurality of profiles separately from data used by each of the profiles when a plurality of profiles can be stored in an eUICC.

The present invention also provides a method for managing a plurality of profiles in an eUICC efficiently by newly defining data (common data) commonly used by a plurality of profiles as a common profile (that is, a type of profile) when a plurality of profiles can be stored in an eUICC.

Technical Solution

An aspect of the present invention provides an embedded Universal Integrated Circuit Card (eUICC) which is embedded in a terminal and interworks with a Mobile Network Operator (MNO), wherein the eUICC includes a common profile in at least one form of application and data, which retains common data which can be used commonly by a plurality of profiles.

Another aspect of the present invention provides a method for managing a plurality of profiles in an embedded Universal Integrated Circuit Card (eUICC) which is embedded in a terminal and interworks with a Mobile Network Operator (MNO), the method comprising: a step of loading, by the eUICC, a common profile, in form of at least one of application and data, which can retain common data which can be used commonly by a plurality of profiles in the eUICC; and a step of updating the common data retained by the common profile when an active profile is loaded.

Other aspect of the present invention provides a method for managing a plurality of profiles in an embedded Universal Integrated Circuit Card (eUICC) which is embedded in a terminal and interworks with a Mobile Network Operator (MNO), the method comprising: a step of storing, by the eUICC, a common profile, are in form of at least one of application and data, which retains common data which can be used commonly by a plurality of profiles in the eUICC and; a step of accessing, by the eUICC, the common profile in order for a specific profile among the plurality of profiles to use the common data.

Still other aspect of the present invention provides a terminal providing a communication service by interworking with a Mobile Network Operator (MNO), wherein the terminal embeds an embedded Universal Integrated Circuit Card (eUICC) storing a common profile in at least one form of application and data, which retains common data which can be used commonly by a plurality of profiles.

MODES OF THE INVENTION

Figure 1:
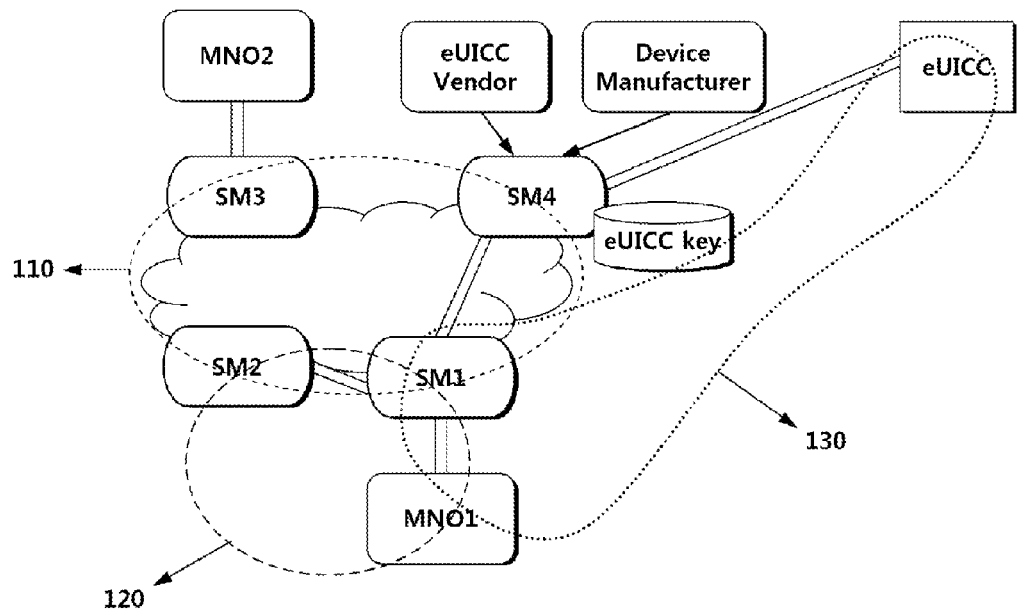
FIG. 1 illustrates an overall service architecture including an eSIM (eUICC) to which the present invention is applied.

Hereinafter, exemplary embodiments of the present invention will be described will be described with reference to the accompanying drawings. In the following description, the same elements will be designated by the same reference numerals although they are shown in different drawings. Furthermore, in the following description of the present embodiment, a detailed description of know functions and configurations incorporated herein will be omitted when it may make the subject matter of the present embodiment unclear.

A Machine-to-Machine (M2M) terminal which is being discussed currently in a Global Systems for Mobile communications association (GSMA) should have a small size according to its characteristic. However, when a conventional UICC is used for the M2M terminal, a module for installing the UICC in the M2M terminal should be prepared separately. Thus, miniaturization of the M2M terminal becomes difficult if the M2M terminal is manufactured in a form having a structure of a removable UICC.

Therefore, a structure of an embedded UICC (eUICC) which is non-removable is being discussed. In this case, information about a mobile network operator (MNO) using the eUICC should be stored in the eUICC in a form of International Mobile Subscriber Identity (IMSI).

However, an IMSI in the eUICC of a terminal can be assigned when the terminal is used only for a specific mobile network operator designated in the manufacturing step of the terminal. Thus, a MNO placing an order for terminals and a manufacturer of the terminals should consider a stock inventory of manufactured terminals, and which becomes a reason of increasing sale prices of terminals. These problems are being big obstacles to expanding bases of M2M terminals.

As described above, as opposed to the conventional removable SIM, an embedded SIM (hereinafter, referred to as 'eSIM' or 'eUICC') has many issues such as an authority of opening, an initiative on value-added services, security of subscriber information, and so on. For these, international standardization organizations such as a GSMA and a European Telecommunication Standards Institute (ETSI) are performing standardization on necessary elements including top structures by interworking with related entities such as operators, manufacturers, SIM vendors, etc. A subscription manager (SM) is being focused upon in the standardization organizations as a main issue of the standardization on the eSIM.

The SM means an entity or a function/role of performing overall managements on the eSIM such as issuing important profiles (referred to as 'Operator Credentials', 'MNO Credentials', 'Profile', 'eUICC Profile', 'Profile packages', etc.), and processing a procedure of subscription change, etc.

Recently, the GSMA proposed a structure in which the SM is divided into a SM-Data Preparation (SM-DP) performing a role of generating operator information and a SM-Secure Routing (SM-SR) performing a role of direct delivery of the operator information. However, detail, technical, and actual issuing mechanism has not been mentioned.

Therefore, in the present invention, a method of managing eSIM using generation of a dynamic encryption key is proposed in the environment of separated roles of SM defined in the GSMA.

In this specification, the terminologies 'eSIM' and 'eUICC' are used as an identical concept.

The eSIM is a technology of SIM having a new concept. In a step of manufacturing a terminal, an IC chip is attached on a circuit board of the terminal, and SIM data (such as information about opening, value-added services, etc.) in a form of software are issued via Over-The-Air (OTA) or offline interface (such as connection with a PC based on a universal serial bus (USB), etc.). The IC chip used for the eSIM generally supports a hardware-based Crypto Co-Processor (CCP), generates a hardware-based public key, and provides application programming interfaces (API) which can be utilized by an application (for example, applet) to a SIM platform (for example, Java card platform, etc.). The Java card platform is one of platforms in which multiple applications are installed and which provides service in a smart card.

Due to a restricted memory space of the IC chip and security issues, applications cannot be installed by everyone in the SIM. Accordingly, a SIM service management platform for installation and management of applications in the SIM is needed in addition to the platform of applications. The SIM service management platform may issue data in a memory region of the SIM through authentication and security using a management key. A GlobalPlatform, a Remote File Manager (RFM), and a Remote Application Manager (RAM) which are specified in ETSI TS 102.226 are standard technologies for the SIM service management platform.

The SM, one of important elements of an eSIM environment, acts a role of remotely issuing data of communication and value-added services through a management key (such as a UICC OTA key, a Global Platform Issuer Security Domain (GP ISD) key, etc.).

Here, the management key (an eSIM management key or an eUICC management key) is used to deliver operator information securely to the eSIM as an access authentication key, and differentiated from an encryption key (a public key, etc.) which is mainly described in the present invention. The management key may also be represented as 'eUICC access credentials' which will be explained later.

In the GSMA, a role of the SM is classified into a SM-DP and a SM-SR. The SM-DP may perform a role of safely building an operation profile (or, operator information), IMSI, K, OPc, value-added service applications, and value-added service data and making a credential package for them. The SM-SR may perform a role of downloading safely the credential package generated by the SM-DP to the eSIM via SIM remote management technologies such as an OTA, a GP Secure Communication Protocol (GP SCP), etc.

Also, a structure of a 'Circle of Trust' shown in FIG. 1, which has a concept that an end-to-end trusted relation between a MNO and an eSIM is established based on overlapped trusted relations between each similar entity and entities, has been proposed. That is, a first MNO (MNO1) forms a trusted relation with a first SM (SM1), the first SM (SM1) forms a trusted relation with a fourth SM (SM4), and the fourth SM (SM4) forms a trusted relation with the eSIM. Accordingly, the trusted relation between the MNO and the eSIM may be established.

Before explaining the present invention, terminologies used in this specification are explained.

A 'MNO' means a mobile network operator, an entity providing mobile communication services to its customers through mobile networks.

Also, a 'SM' means a subscription manager, and performs a function of managing an eUICC.

Also, an 'eUICC supplier' means a provider of an eUICC module and resident software (such as a firmware, an operating system, etc.).

Also, a 'device vendor' means a provider of devices (that is, terminals) which require an UICC (or, an eUICC), especially, devices including a function of a wireless modem for a mobile network operated by a MNO.

Also, a 'provisioning' means a procedure of loading a profile into an eUICC, and a provisioning profile means a profile used for a device to access a communication network for the purpose of provisioning other provisioning profiles or operational profiles.

Also, a 'subscription' means a commercial relationship between a subscriber and a mobile communication service provider (a MNO) providing services to the subscriber.

Also, 'eUICC access credentials' mean data in an eUICC, used for setting up secured communications between the eUICC and an external entity to manage profiles in the eUICC.

Also, 'profile access credentials' mean data in a profile or the eUICC, used for setting up secured communications between the eUICC and an external entity to protect or manage a profile structure and data of the profile.

Also, a 'profile' means all information which can exist in the eUICC, a file structure which can be provisioned to the eUICC, or managed in the eUICC, combinations of data and applications. The profile may include an operational profile (that is, operator information), a provisioning profile (a profile for provisioning), a profile for other policy control functions (PCF), and so on.

Here, an 'operational profile' or 'operator information' means all kinds of profiles related to an operational subscription.

FIG. 1 illustrates an overall service architecture including an eSIM (eUICC) to which the present invention is applied.

The entire system may be explained as follows.

An eUICC system architecture to which the present invention is applicable may comprise a plurality of MNO systems, at least one SM system, an eUICC vendor system, a system of a manufacturer of a device equipped with an eUICC, and an eUICC. Explanations on each entity are as follows.

In FIG. 1, a dotted line represents a circle of trust, and a line comprising two full lines means a secured link.

If a scenario in which subscription information is stored and delivered is needed, it should be performed under authorization of a MNO and control of the MNO. Only one active profile should exist in a single eUICC at a certain time. At this time, the active profile means a profile added to a single HLR at the certain time.

An MNO and an eUICC should be able to decode MNO credential information, that is, profiles (an operational profile, a provisioning profile, etc.). The only exception for this may be a third party organization trusted by a specific MNO, for example, a SIM vendor. However, it is not a general function of the third party organization for performing the function.

A subscription cannot be switched in an eUICC when it is out of an operational policy control. A user should know any change in a MNO context and its activated subscription, be able to avoid a security danger, and require a security level up to a degree of competing with a current UICC model.

MNO credentials or a profile may mean subscription credentials including K, an algorithm, parameters for an algorithm, a value-added service application, value-added service data, etc.

A delivery of the MNO credentials or the profile should be performed from end to end in a secured manner. The delivery may be performed with continuous steps which do not break a security chain, and all the steps in the delivery chain should be performed under identification and authorization of a MNO. Although any entities in the delivery chain should not be able to identify the MNO credentials, the only exception is a third party organization trusted by a specific MNO, for example, a SIM vendor. However, it is not a general function of the third party organization.

An operator should have a complete right in controlling its credentials, and have strong rights in directing and controlling SM operations.

The SM functions should be provided by a MNO or a third-party organization. If they are provided by a third-party organization, there may be a commercial relationship between the SM and the MNO.

For managing subscriptions, the SM does not have any direct relationships with subscribers of a MNO. Although a MNO is required to have relationships with subscribers and to be an entry point for customer subscription, it is intended that the MNO go along with a contact between a M2M service provider (that is, a subscriber of the MNO) and customers of the M2M service provider.

When MNOs are being swapped, a donor MNO and a receiving MNO may have a previously made contract or not. A mechanism for approving the previous contract is necessary. A function of policy control of the donor operator may define a condition for removing it credentials, and a policy control function (PCF) may implement such the function.

The architecture introduces a function defined as a SM, and a main role of the SM is preparing a package or a profile including MNO credentials and delivering it to an eUICC. The function of a SM may be provided directly by a MNO. Or, a MNO may make a contract with a third-party organization in order to obtain a SM service.

A role of the SM may be divided into two sub functions such as a SM-SR and a SM-DP.

Actually, the functions of SM-SR and SM-DP may be provided by different entities or a single entity. Therefore, a boundary between the functions of SM-SR and SM-DP is required be set clearly, and interfaces between the two entities are required to be defined.

The SM-DP may be responsible for securely preparing a package or profile to be delivered to an eUICC, and interwork with the SM-SR for actual transmission of the package or profile. The core functions of the SM-DP are as follows. In addition to the following functions, additional functions may be added later.

1) Managing functional characteristics and certification level of an eUICC

2) Managing MNO credentials and profiles (for example, they include at least one of IMSI, K, additional service applications, and additional service data. Also, some of them may be enciphered by a MNO.)

3) Calculating an OTA package for downloading by the SM-SR

If the functions of the SM-DP are provided by a third-party organization, security and trusted relationship may become more important. In addition to a function of a real-time provisioning, the SM-DP may have a function of background processing to a not inconsiderable extent. Also, it is predicted that requirements on performance, scalability, and reliability of the SM-DP become more important.

The SM-SR may be responsible for a role of routing and delivering the credential package to a corresponding eUICC safely. The core functions of the SM-SR are as follows.

1) Managing OTA communications with an eUICC through a ciphered virtual private network (VPN)

2) Managing communication with another SM-SR to form an end-to-end path to an eUICC 3) Managing eUICC data used for SM-SR OTA communications provided by an eUICC supplier 4) Protecting communications with an eUICC by filtering only allowed entities (that is, a function of fire wall)

A SM-SR database may be provided by an eUICC vendor, a device (such as a M2M terminal, etc.) vendor, and, potentially, a MNO, and may be used by a MNO through a SM-SR mesh network.

The circle of trust may enable an end-to-end secured link during the delivery of a provisioning profile, and the SM-SR may share the circle of trust for a safe routing of the provisioning profile and an eUICC discovery. An MNO may be linked to SM-SR and SM-DP entities in the circle of trust, or, the MNO may provide these functions autonomously. In order to prevent an illegal use of an eUICC (such as cloning, illegal uses of credentials, service denying, illegal MNO context change, etc.) without violation of duties based on contracts or regulations, a secured end-to-end link between an eUICC and MNO credential is required.

That is, in FIG. 1, a notation 110 may represent a circle of trust formed between SMs, more specifically a circle of trust formed between SM-SR members, and a notation 120 may represent a circle of trust between MNO partners, and a notation 130 may represent an end-to-end secure link.

Figure 2:
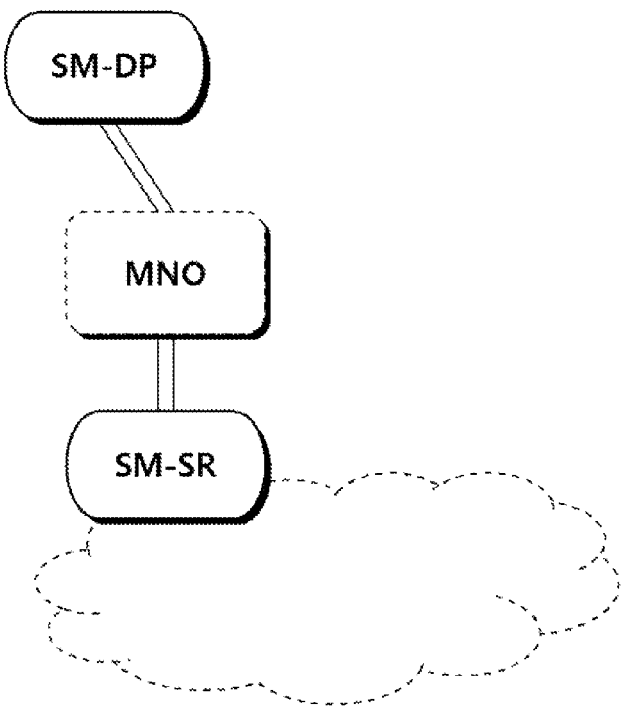
FIG. 2 illustrates a configuration in which a SM-SR and a SM-DP are located in a system, in an environment in which a role of SM is separated.

FIG. 2 illustrates a configuration in which a SM-SR and a SM-DP are located in a system, in an environment in which a role of SM is separated.

As shown in FIG. 2, a SM may be divided into a SM-DP which safely prepares various profiles related to an eUICC (such as an operational profile of a MNO, a provisioning profile, etc.) and a SM-SR for routing them. Also, the SM-SR may interwork with other multiple SM-SRs with trusted relationships, and the SM-DP may interwork with a MNO system.

Of course, arrangement of the SM-DP and the MNO system may be implemented differently from the case of FIG. 2. That is, the SM-DP may interwork with the SM-SR, and the MNO system may interwork with the SM-DP.

Under the above-described environment, a plurality of operational profiles of MNOs may exist within an eUICC in application and data forms. However, at a time, only one active operational profile exists within the eUICC. At this time, the rest of operation profiles may be inactive operational profiles. In this case, two problems causing performance degradation may exist potentially.

The first one is a problem of causing slow processing speed, and the second one is a problem of memory resources.

Among these two problems, the second problem is that each of a plurality of operation profiles has contents of elementary files respectively so that memory resources are wasted. Also, there may be a requirement that data stored by a specific MNO such as phonebook data, etc. should be maintained even when a current MNO is changed from the specific MNO to another MNO and another operational profile is activated.

Figure 3:
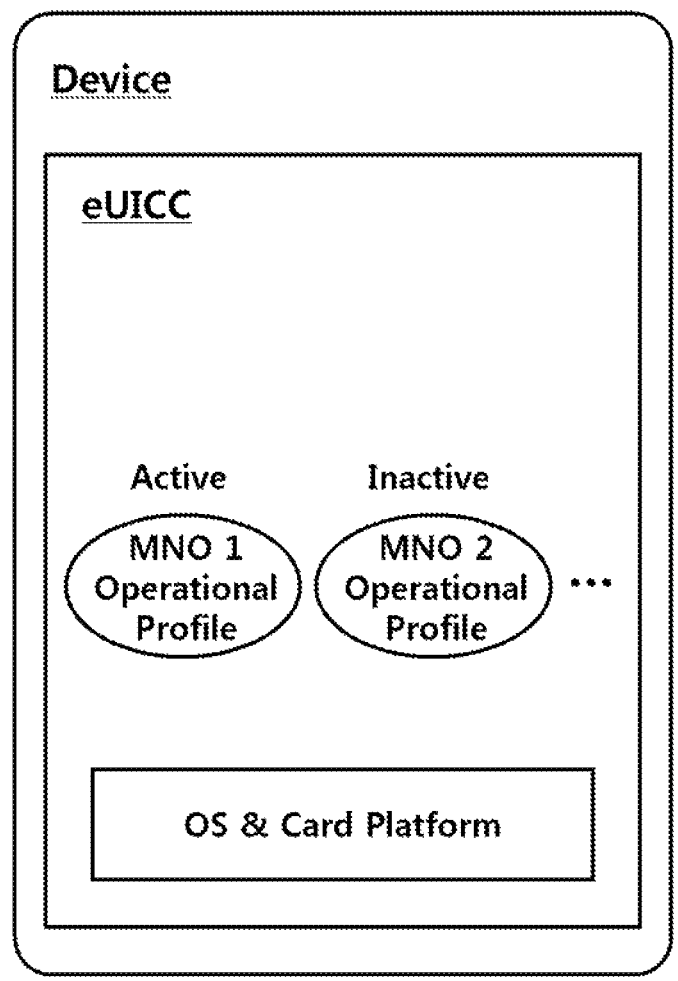
FIG. 3 illustrates an internal structure of a general eUICC embedded in a device, and illustrates a case in which two operational profiles are stored.

FIG. 3 illustrates an internal structure of a general eUICC embedded in a device, and illustrates a case in which two operational profiles are stored. However, a device in FIG. 3 may also be referred to as a terminal.

In this case, a plurality of operational profiles of MNOs may be pre-installed in an eUICC, or may be installed in the procedures of changing MNO. At a certain time, only one operational profile may exist as activated. At this time, each of the operational profiles may have all elementary files independently.

However, since the eUICC can be used for a M2M terminal or a mobile terminal, a cost of memory may increase as memory size of the eUICC increases. In this respect, if each of operational profiles has all contents of elementary files of MNOs independently, problems in the following description may occur.

1. Waste of memory resources may occur.

2. The processing speed of a procedure of transmitting operational profiles remotely and a procedure of installing and loading may be slowed.

Also, there may be a requirement that data stored by a specific MNO such as phonebook data, etc. should be maintained even when a current MNO is changed from the specific MNO to another MNO and another operational profile is activated.

That is, even when a current MNO is changed or operational profiles are swapped, user data or data not to be deleted should be maintained. Here, the swapping of operational profiles means activation and deactivation of operational profiles, or deletion and loading of operational profiles.

Therefore, the present invention provides a method of making elementary files (EP) which can be used commonly by a plurality of operational profiles be made and used as common contents in the common operational profile.

Accordingly, an example embodiment of the present invention provides a method for separately managing common data among parameters and fields of all operational profiles in an eUICC storing operational profiles of various communication manners and/or various operators.

According to an example embodiment of the present invention, in an eUICC storing operational profiles of various communication manners and/or various operators, common data among parameters and fields of all operational profiles are defined as a common operational profile, and unique data for each of communication manners or operators are managed separately.

In this specification, an active profile means a profile whose file or application can be selected through an UICC-terminal interface under control of a Policy Control Function (PCF) related to a MNO.

Also, the common operational profile means data which can be used commonly by operational profiles of each MNO among contents of the operational profiles.

Figure 4:
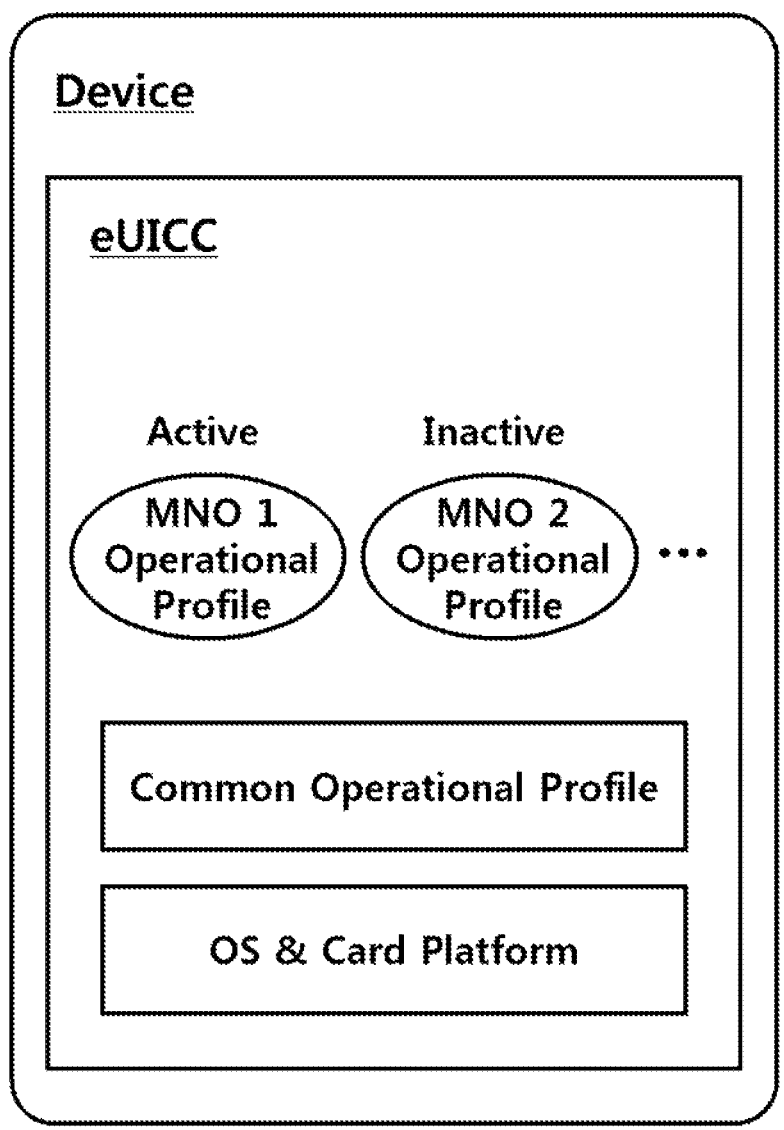
FIG. 4 illustrates an internal structure of an eUICC using a common operational profile according to an example of the present invention.

FIG. 4 illustrates an internal structure of an eUICC using a common operational profile according to an example of the present invention.

As shown in FIG. 4, common profile data which can be retained by a common operational profile of a MNO and unique profile data which can be retained by a respective operational profile (that is, unique profile data for each MNO or each communication manner). However, among unique contents which can be retained by each operational profile independently, contents which are not used by a corresponding MNO in each operational profile may be excluded.

Contents of the common operational profile may be used commonly for 2G, 3G, and LTE.

Contents of the common operational profile may be configured with files meeting the following criteria. Firstly, files which can be modified by a user (for example, a phonebook) may be included in the common operational profile. Secondly, files in which values obtained from a terminal system are stored may be included in the common operational profile. That is, files which can be modified by the terminal system (for example, location information: LOCI, SLOCI, etc.) may be included in the common operational profile.

A scenario that the common operational profile is filled is described as follows.

When the common operational profile is initially loaded, the common operational profile is filled with default values. For example, a memory may be filled with the default values which may be null values or specific characters such as "F"s.

When an operational profile of MNO1 is being loaded, contents (files) of the common operational profile which need to be modified by a terminal system are filled. For example, the contents may be LOCI, SLOCI, etc.

Then, the contents of the files for the common operation profile, which can be modified by a user, are filled (for example, phonebook, SMS, etc.).

Then, a network operator is changed from MNO1 to MNO2.

The contents (files) of the common operational profile, which need to be modified by a terminal system, are updated when the operational profile of MNO2 is being loaded. For example, the contents may be LOCI, SLOCI, etc.

The use may still use the contents (for example, phonebook, SMS, etc.) of the common operational profile which were modified by the user when the user was subscribing to the MNO1.

The contents (for example, phonebook, SMS, etc.) of the common operational profile, which were modified by the user when the user was subscribing to the MNO1, may be updated.

The data included in the common profile may have a file structure comprising items such as a Master File (MF), a Universal Subscriber Identity Module (USIM), a GSM-ACCESS, GSM, TELECOM, etc., and information related to each of the items. The information related to each of the items may be configured as shown in the below tables 1 to 6. However, they are not restricted to the following specific examples.

TABLE 1

| Item | Information |
|---|---|
| Master File | eICCID |

TABLE 2

| Item | Information |
|---|---|
| USIM (Universal Subscriber Identity Module) | Keys |
| | KeysPS |
| | PLMNwAcT |
| | HPLMN |
| | ACMmax |
| | ACM |
| | PUCT |
| | CBMI |

TABLE 2-continued

| Item | Information |
|---|---|
| | LOCI |
| | CBMID |
| | CBMIR |
| | PSLOCI |
| | FDN |
| | SMS |
| | MSISDN |
| | SMSS |
| | Ext2 |
| | Ext3 |
| | SMSR |
| | ICI |
| | OCI |
| | ICT |
| | OCT |
| | Ext5 |
| | CCP2 |
| | AAeM |
| | Hiddenkey |
| | EXT4 |
| | CMI |
| | ACL |
| | DCK |
| | CNL |
| | START-HFN |
| | THRESHOLD |
| | NETPAR |
| | PNN |
| | EXT6 |
| | MBI |
| | EXT7 |
| | EPSLOCI |
| | EPSNSC |
| | SQN |

TABLE 3

| Item | Information |
|---|---|
| GSM-ACCESS | Kc |
| | KcGPRS |
| | CPBCCG |
| | Invscan |

TABLE 4

| Item | Information |
|---|---|
| GSM | Kc |
| | PLMNSel |
| | HPPLMN |
| | ACMmax |
| | ACM |
| | CBMI |
| | BCCH |
| | LOCI |
| | KcGPRS |
| | LOCIGPRS |
| | Invscan |

TABLE 5

| Item | Information |
|---|---|
| TELECOM | ADN |
| | EXT1 |
| | SMS |
| | SMSS |
| | Ext2 |
| | Ext3 |
| | SMSR |

TABLE 5-continued

| Item | Information |
| --- | --- |
|  | ECCP |
|  | EXT4 |
|  | CMI |

TABLE 6

| Item | Information |
| --- | --- |
| PHONEBOOK | IAP |
|  | IAP1 |
|  | IAP2 |
|  | IAP3 |
|  | ADN |
|  | ADN1 |
|  | ADN2 |
|  | ADN3 |
|  | EXT1 |
|  | PBC |
|  | PBC1 |
|  | PBC2 |
|  | PBC3 |
|  | GRP |
|  | GRP1 |
|  | GRP2 |
|  | GRP3 |
|  | AAS |
|  | GAS\ |
|  | ANR |
|  | ANR1 |
|  | ANR2 |
|  | ANR3 |
|  | SNE |
|  | SNE1 |
|  | SNE2 |
|  | SNE3 |
|  | CCP1 |
|  | UID |
|  | UID1 |
|  | UID2 |
|  | UID3 |
|  | PSC |
|  | CC |
|  | PUID |
|  | EMAIL |
|  | EMAIL1 |
|  | EMAIL2 |
|  | EMAIL3 |

In the case of phonebook, the number of entries of the phonebook is configured with an input parameter of the common operational profile.

Meanwhile, unique parameters and fields, which a plurality of operational profiles independently have, may have a file structure including items such as a universal subscriber identity module (USIM), an IP multimedia service identity module (ISIM)-ACCESS, a Home node B (HNB), a GSM, a TELECOM, etc. and information related to the items. The information related to the above-described items may be configured as follows. However, the information may not be restricted to the below example.

The items (parameters or fields) included in the data which a plurality of operational profiles independently have may be configured as examples shown in FIGS. 7 to 11. However, they are not restricted to the below example.

TABLE 7

| Item | Information |
| --- | --- |
| USIM (Universal Subscriber Identity Module) | LI |
|  | IMSI |
|  | UST |

TABLE 7-continued

| Item | Information |
| --- | --- |
|  | GID1 |
|  | GID2 |
|  | SPN |
|  | ACC |
|  | FPLMN |
|  | AD |
|  | ECC |
|  | SMSP |
|  | SDN |
|  | eMLPP |
|  | BDN |
|  | EST |
|  | OPLMNwAcT |
|  | HPLMNwAcT |
|  | ARR |
|  | OPL |
|  | MBDN |
|  | MWIS |
|  | CFIS |
|  | SPDI |

TABLE 8

| Item | Information |
| --- | --- |
| ISIM-ACCESS | IMPI |
|  | OMAIN |
|  | MPU |
|  | D |
|  | RR |
|  | ST |
|  | P_CSCF |

TABLE 9

| Item | Information |
| --- | --- |
| HNB(Home Node B) | ACSGL |
|  | CSGT |
|  | HNBN |
|  | OCSGL |
|  | OCSGT |
|  | OHNBN |

TABLE 10

| Item | Information |
| --- | --- |
| GSM | LP |
|  | IMSI |
|  | SST |
|  | GID |
|  | GID2 |
|  | SPN |
|  | PUCT |
|  | ACC |
|  | FPLMN |
|  | AD |
|  | Phase |
|  | eMLPP |
|  | AAeM |
|  | CBMIR |
|  | DCK |
|  | CNL |
|  | SUME |
|  | PLMNwAcT |
|  | OPLMNwAcT |
|  | HPLMNwAcT |
|  | CPRCCH |

TABLE 11

| Item | Information |
| --- | --- |
| TELECOM | ARR |
|  | FDN |
|  | MSISDN |
|  | SMSP |
|  | SDN |
|  | SUME |
|  | LND |
|  | BDN |

In the above tables 1 to 11, information related to each item may be included in an elementary file (EF) defined in the eUICC, or may be an elementary file itself.

Figure 5:
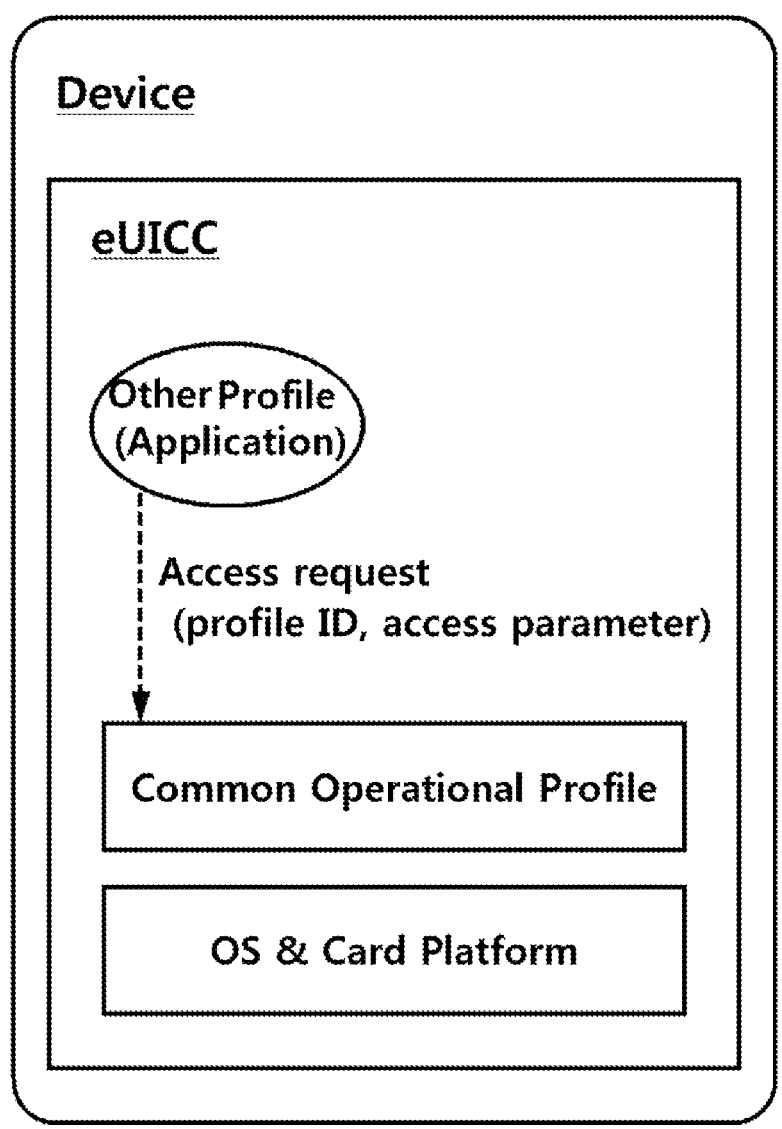
FIG. 5 is a view illustrating access control on a common operational profile according to an example embodiment of the present invention.

FIG. 5 is a view illustrating access control on a common operational profile according to an example embodiment of the present invention.

Referring to FIG. 5, in an example embodiment of the present invention, a content of a common operational profile may control accesses of other applications (other profiles) in the eUICC of the terminal via the below access control.

When other applications in the eUICC access the common operational profile in order to read data, the common operational profile should receive an operational profile ID (also referred to as an 'operational ID' or a 'profile ID') and a specific parameter (access parameter) together. Then, the common operational profile should respond only to requests whose preregistered operational profile ID and access parameter are checked. (That is, an access of a profile which is not registered is prohibited as shown in the figure.).

In other words, referring to FIG. 5, in order for other profile (application) such as an operational profile to access the common operational profile and read the data (information, values, etc.) in the common operational profile, the other profile should transmit, to the common operational profile, its profile ID and access parameter together with an access request.

FIGS. 6 to 9 illustrate a procedure of storing or updating an operational profile in an eUICC according to an example embodiment of the present invention.

Figure 6:
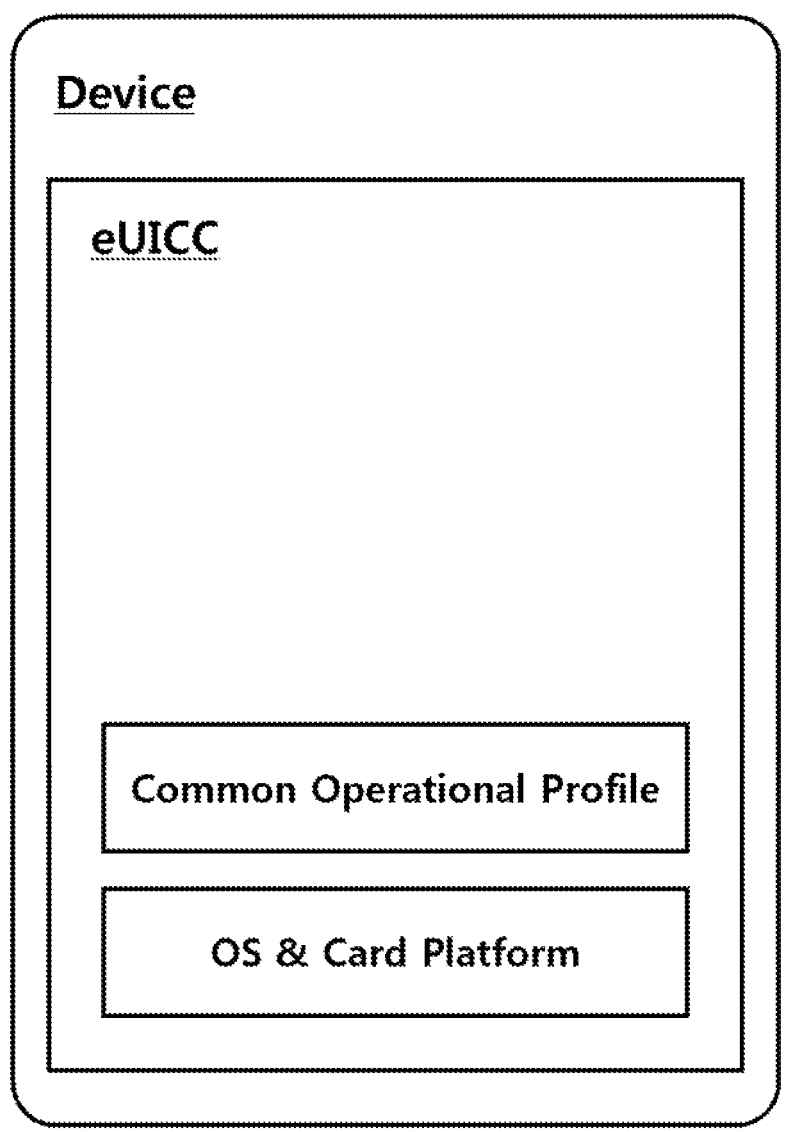
FIGS. 6 to 9 illustrate a procedure of storing or updating an operational profile in an eUICC according to an example embodiment of the present invention.

According to the present invention, FIG. 6 illustrates a case in which a common operational profile is installed in the eUICC when the eUICC is embedded in a terminal.

In this case, when the common operational profile is installed, the number of entries of the phonebook is configured with an input parameter of the common operational profile.

Figure 7:
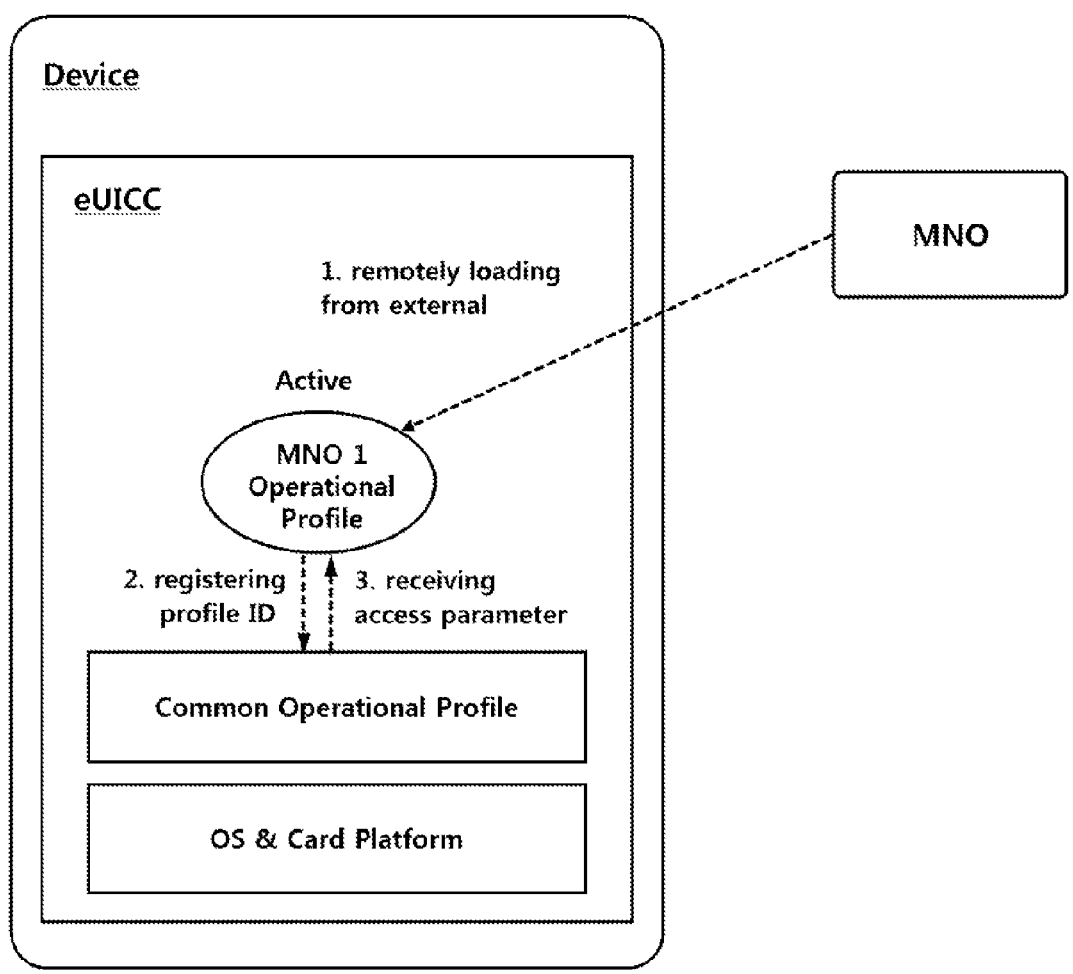

FIG. 7 illustrates a case in which an MNO loads an operational profile initially.

Referring to FIG. 7, when a MNO loads an operational profile initially, 1) a procedure of loading the operational profile from external, 2) a procedure of registering an operational profile ID (or, an operational ID or a profile ID) to the common operational profile, and 3) a procedure of obtaining access parameter from the common operational profile may be performed.

Figure 8:
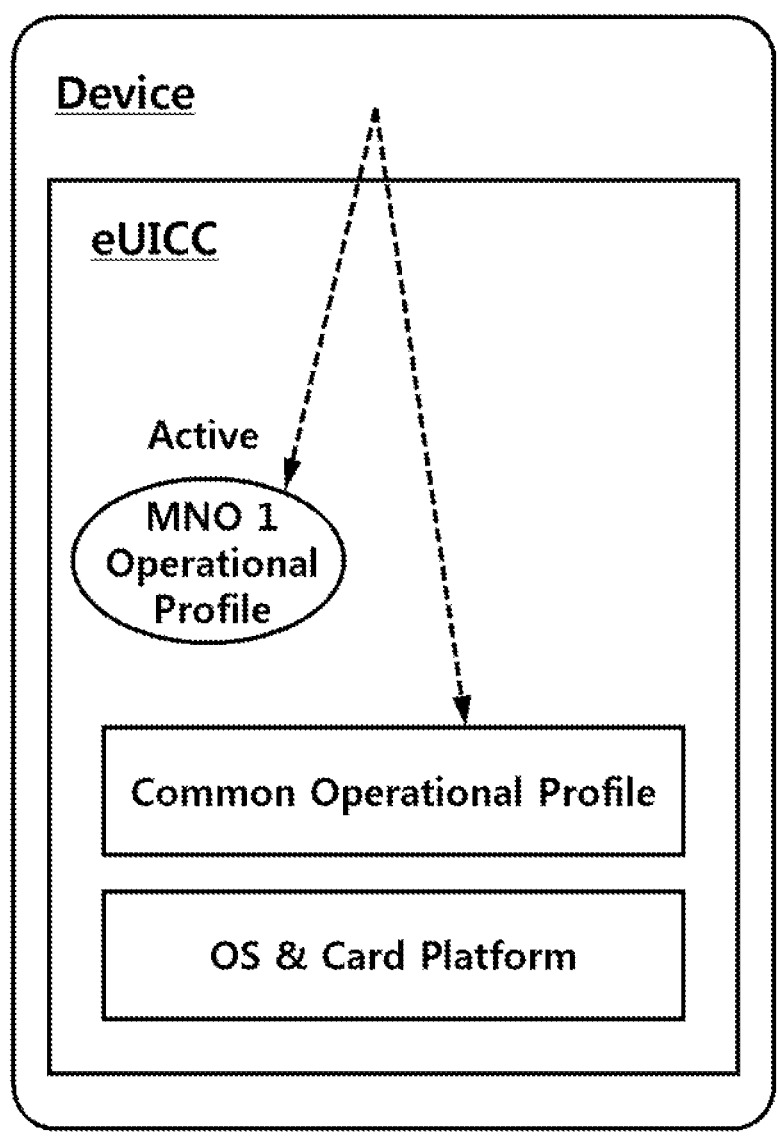

FIG. 8 is a view illustrating a procedure that a terminal (device), that is a terminal system, reads or writes values (data) necessary for a common operational profile.

Through a procedure illustrated in FIG. 8, data (common data) included in the common operational profile may be generated or updated.

Figure 9:
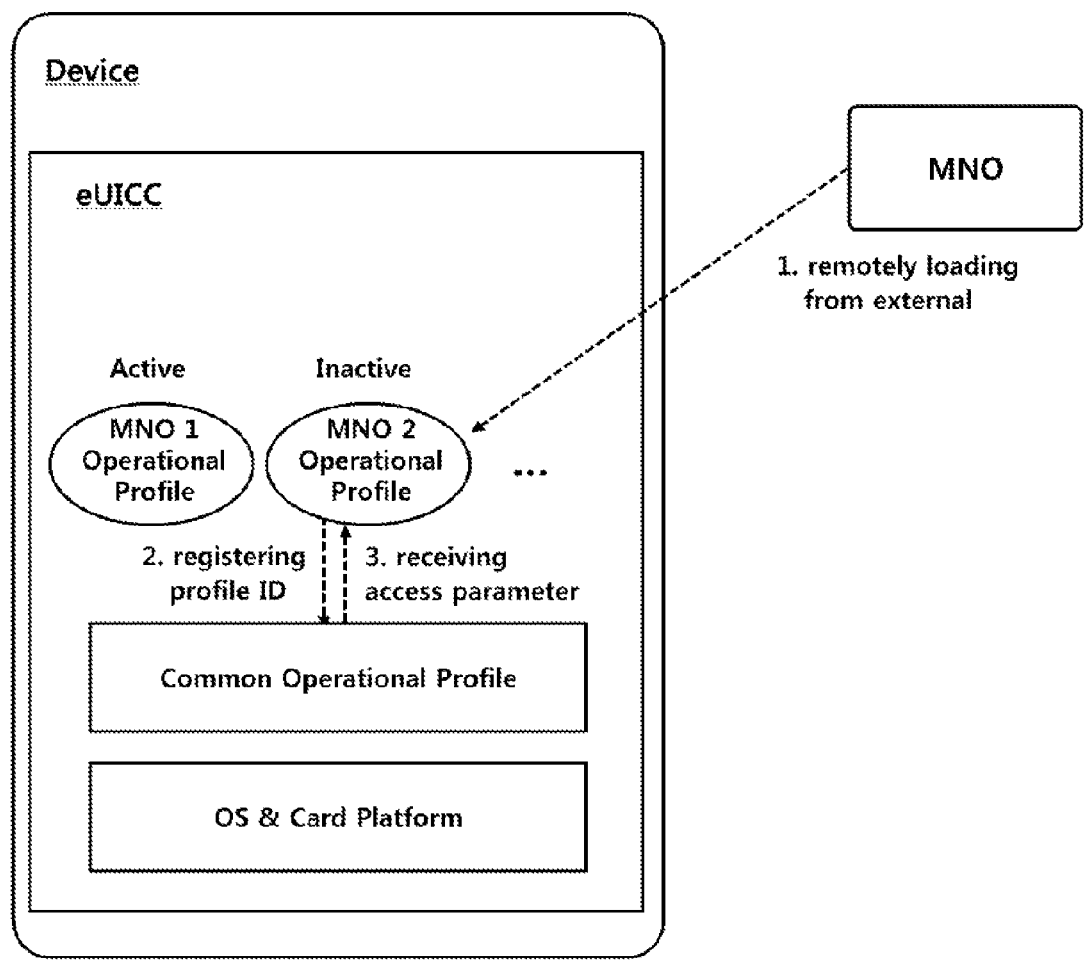

FIG. 9 illustrates a case in which an operational profile changes from MNO1 to MNO2.

Referring to FIG. 9, when an operational profile changes from MNO1 to MNO2, 1) a procedure of loading an operational profile from external, 2) a procedure of registering an operational profile ID to the common operational profile, and 3) a procedure of obtaining access parameter from the common operational profile may be performed.

In accordance with a method for managing a plurality of profiles in an eUICC according to the above-described example embodiment of the present invention, by storing common data which can be used commonly by operational profiles among data (information, contents, files, etc.) of the operational profiles in a common operational profile, each of the operational profiles may retain only unique data for each excluding the common data.

If the method for managing a plurality of profiles in an eUICC according to an example embodiment of the present invention is used, since each of the operational profiles does not need to retain common data, waste of eUICC memory resources can be reduced.

Also, the method for managing a plurality of profiles in an eUICC according to an example embodiment of the present invention may provide access control on inter-profile accesses when a plurality of operational profiles use the common data retained in the common operational profile.

Accordingly, accesses on the common operation profile without permission may be controlled.

Hereinafter, the above-described method for managing a plurality of profiles in an eUICC according to an example embodiment of the present invention, the eUICC and a terminal embedding the eUICC for the method will be explained again. However, since operational profile and common operational profile are a kind of profile, hereinafter, an operational profile may also be referred to as a profile and a common operational profile may also be referred to as a common profile.

As shown in FIGS. 4 to 9, the eUICC according to an example embodiment of the present invention, as an eUICC which interworks with a MNO and is embedded in a terminal, stores a common profile retaining common data which can be used by a plurality of profiles in at least one form of application and data.

Such the eUICC may include memory resources as its configuration in order to store at least one profile and common profile.

The data used respectively by each of the plurality of profiles, which are already stored in the eUICC or will be stored, may include unique data independently for each profile which do not need to be used commonly by other profiles and common data which can be used commonly by other profiles and the common profile retains.

For example, data (for example, EF files) used by a first profile (for example, an operational profile of a first MNO) may include the common data and the unique data for the first profile. Also, among data used by the first profile, the common data is data used commonly by the first profile and other profiles. The unique data is data which is used by only the first profile and does not need to be used by other profiles among data used by the first profile. Also, the common data is retained in the common profile (for example, a common operational profile), and the unique data is retained in the first profile.

Also, the above-described common data may include at least one of eUICC identity information (for example, eICCID), user data, etc.

The user data (also referred to as a user data or a subscriber data) included in the common data may include, for example, data for at least one of a phonebook storing information on contacts such as telephone numbers, messages, etc. Here, as an example, the messages may be Short Message Service (SMS) messages, Multimedia Message Service (MMS) messages, etc.

Also, the above-described common data may include data obtained from a terminal system (data related to a terminal system) when the active profile is being loaded.

For example, the data related to the terminal system, which can be included in the common data, may include location information. Here, the location information may include, for example, LOCation Information (LOCI), Packet Switched LOCation Information (PSLOCI), etc.

For example, as shown in the above tables 1 to 6, the above-described common data may have a file structure comprising one or more items among a Master File (MF), a Universal Subscriber Identity Module (USIM), a communication network access (for example, GSM-ACCESS, etc.), a communication network (for example, GSM, etc.), and a Telecom, etc., and at least one information related to each of the items. The information related to each of the items may be in form of an Elementary File (EF) of eUICC.

Meanwhile, among data used by each of a plurality of profiles, the unique data retained respectively by each profile may have, for example, as shown in the above tables 7 to 11, a file structure comprising one or more items among a Universal Subscriber Identity Module (USIM), an IP multimedia Service Identity Module (ISIM) access, a base station (for example, Home Node-B, etc.), a communication network (for example, GSM), a Telecom, etc. and at least one information related to each of the items. The information related to each of the items may be in form of an Elementary File (EF) of eUICC.

Meanwhile, the common data retained in the common profile may be updated based on at least one of terminal system related information obtained from a terminal system when the active profile is being loaded and user data according to input of a user.

As described above, the common data retained by the common profile may include various information or contents. Among them, at least one of the eUICC identity information (for example, eICCID, etc.) and user information (for example, phonebook, etc.) may be information which should be included in the common data. The rest of information shown in the above tables 1 to 6 except the essential information (the eUICC identity information and the user information) may be selectively included in the common data.

On the other hand, accesses of other profiles on the common profile may be controlled according to a preregistered profile ID for each of profiles. That is, when a profile tries to access the common profile, access on the common profile may be controlled according to a profile ID of the profile.

For example, a profile ID of a first profile is registered in the common profile, and the first profile transmits an access request and the profile ID to the common profile. Accordingly, the common profile responds to the access request by comparing the profile ID received form the first profile with the profile ID registered in advance.

Each of the above-described plurality of profiles may be an operational profile of the corresponding MNO, and the common profile may be a common operational profile.

Figure 10:
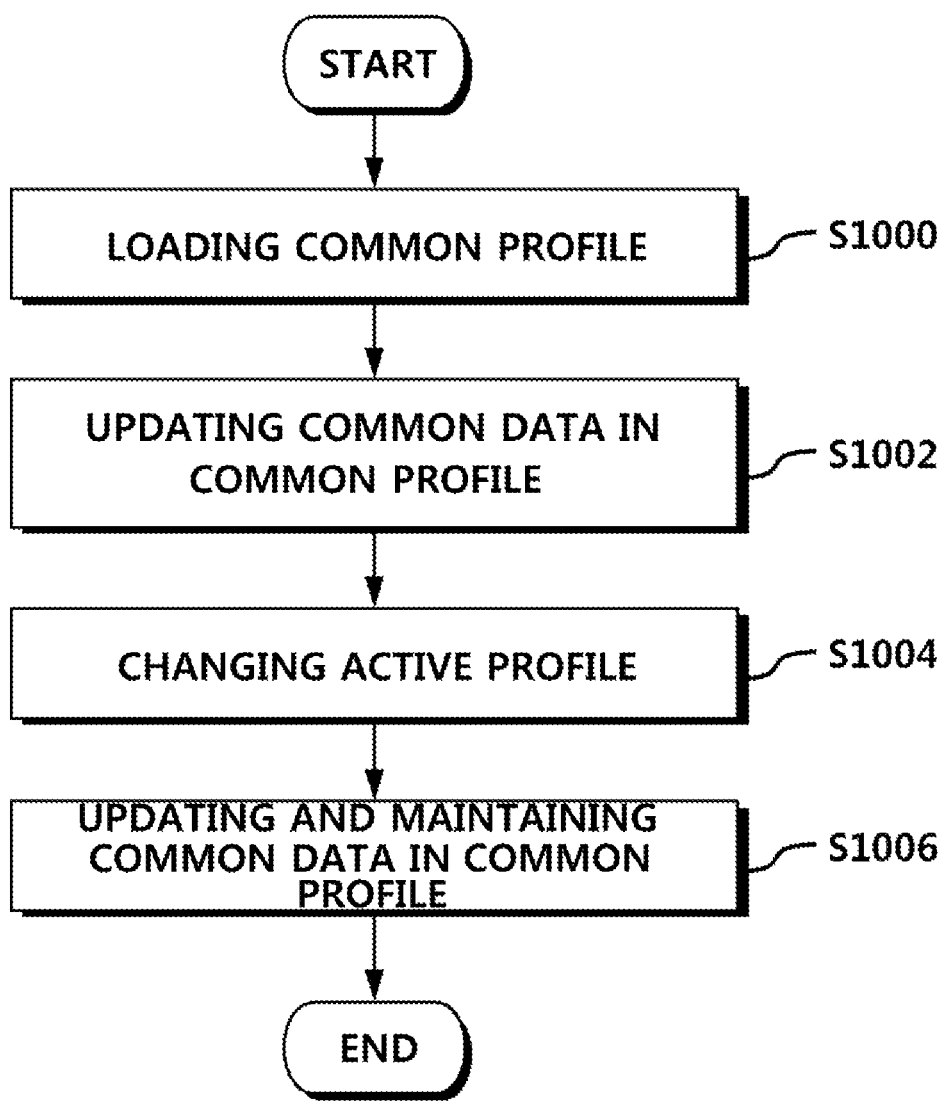
FIG. 10 is a flow chart of a method for managing a plurality of profiles in an eUICC according to an example embodiment of the present invention.

FIG. 10 is a flow chart of a method for managing a plurality of profiles in an eUICC according to an example embodiment of the present invention.

Referring to FIG. 10, a method for managing profiles in an eUICC which interworks with MNO and is embedded in a terminal according to an example embodiment of the present invention may comprise a step S1000 of loading, by an eUICC, a common profile in at least one form of application and data which may retain common data to be used by a plurality of profiles in the eUICC; a step S1002 of updating the common data retained in the common profile based on at least one of a terminal system related data obtained from a terminal system when an active profile is being loaded and a user data according to a user input, etc.

The above-described common data (contents, information, files, etc.) retained in the common profile is data which can be commonly used by a plurality of profiles, and data which need to be maintained even when the active profile is changed.

Such the common data may include eUICC identity information (for example, eICCID, etc.).

Also, the common data may include user data according to inputs of a user. Here, the user data may include, for example, one or more data among a phonebook, messages, etc.

Also, the common data may include a terminal system related data obtained from the terminal system. Here, the terminal system related data may include, for example, location information such as LOCation Information (LOCI), Packet Switched LOCation Information (PSLOCI), etc.

Meanwhile, as shown in FIG. 10, after the above-described step S1002, the method for managing profiles in an eUICC according to an example embodiment of the present invention may further include a step S1004 of loading the active profile changed according to a procedure for changing active profile; a step S1006 of updating the common data retained in the common profile based on a terminal system related data obtained from the terminal system and maintaining data which can be used after an active profile is changed among common data existing before an active profile is changed, etc.

For example, in the above-described step S1004, when a user changes its operator from a first MNO to a second MNO, a profile (operational profile) of the first MNO was activated before the operator is changed. After the operator is changed, the profile of the first MNO is deactivated and the profile of the second MNO is activated. That is, the active profile is changed from the profile of the first MNO to the profile of the second MNO.

Meanwhile, the above-described active profile may be an operational profile of a MNO to which a user subscribes currently.

Figure 11:
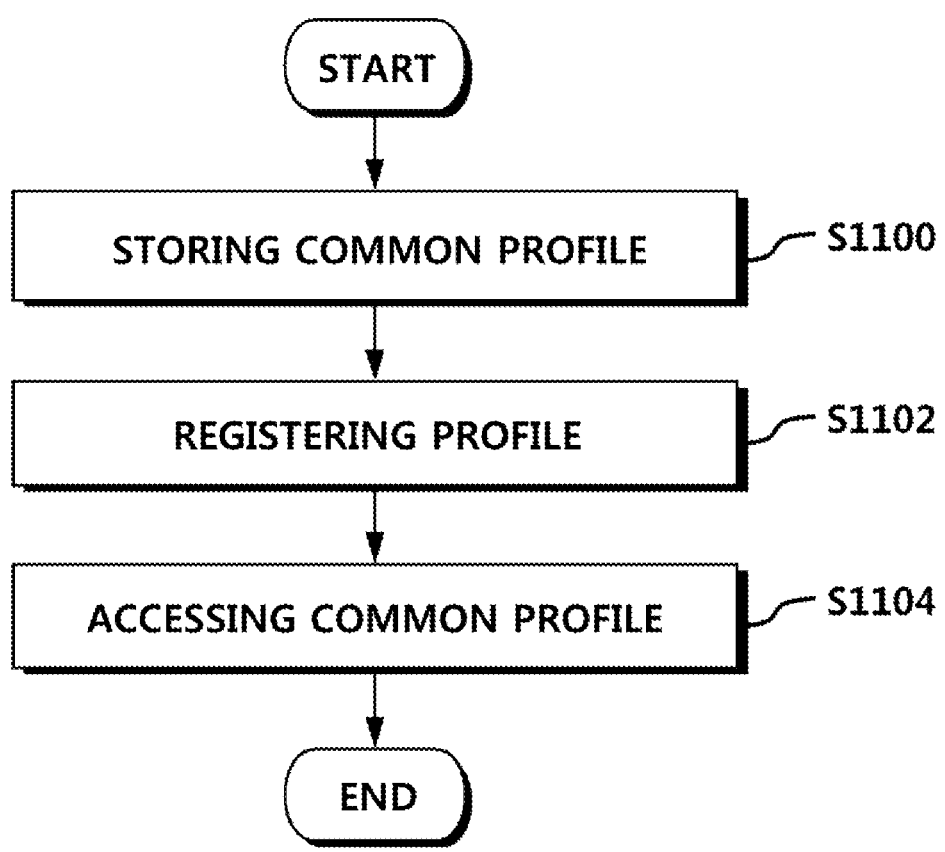
FIG. 11 is another flow chart illustrating a method for managing a plurality of profiles in an eUICC according to an example embodiment of the present invention.

FIG. 11 is another flow chart illustrating a method for managing a plurality of profiles in an eUICC according to an example embodiment of the present invention.

Referring to FIG. 11, a method of managing profiles in an eUICC which is embedded in a terminal and interworks with a MNO according to an example embodiment of the present invention may comprise a step S1100 of storing a common profile retaining common data which can be commonly used by a plurality of profiles in at least one form of application and data; a step S1104 of accessing, by a profile (it may be an active profile) among a plurality of profiles in the eUICC, the common profile in order to use the common data.

In the above-described step S1104, the eUICC may register a profile which can access the common profile, and give permissions on accesses on the common profile only to the registered profiles.

For this, in the step S1104, the eUICC may determine whether a specific profile can access the common profile or not according to the preregistered profile IDs.

As described above, in order to control accesses on the common profile by using the preregistered profile IDs, prior to the step S1104, a step S1102 of registering a specific profile which wants to access the common profile may be needed additionally as shown in FIG. 11.

In the step S1102, the eUICC may register a specific profile as a profile which can access the common profile by registering a profile ID of the specific profile to the common profile and making the specific profile obtain access parameters from the common profile.

In the step S1104 performed after the step S1102, a specific profile of the eUICC transmits, to the common profile, its profile ID and access parameter together with access request on the common profile. Then, the common profile makes access of only access request whose profile ID and access parameter are confirmed possible. Accordingly, the specific profile can access the common profile and read or write some data which is retained in the common profile and it wants to use.

The common data which can be commonly used by a plurality of profiles may, for example, include at least one of eUICC identity information (for example, eICCID, etc.), user data, etc. Here, the user data may include, for example, one or more data among a phonebook, messages, etc.

Also, the common data which can be used commonly by a plurality of profiles may include a terminal system related data obtained from the terminal system. Here, the terminal system related data may include, for example, location information such as LOCation Information (LOCI), Packet Switched LOCation Information (PSLOCI), etc.

A device illustrated in FIGS. 4 to 9 is a terminal which interworks with a MNO and provides communication service. Such the terminal may include an eUICC which stores a common profile (common operational profile) retaining common data (having at least one format of application and data) used commonly by a plurality of profiles (operational profiles).

The common data included in the common profile may include, for example, at least one of eUICC identity information (for example, eICCID), user data, etc. Here, the user data may include, for example, data for at least one of a phonebook, messages, etc.

Also, the common data included in the common profile may include data related to a terminal system obtained from the terminal system. Here, the data related to the terminal system may include location information such as LOCation Information (LOCI), Packet Switched LOCation Information (PSLOCI), etc.

As explained above, according to the present invention, a method for managing a plurality of profiles in an eUICC efficiently may be provided.

Also, according to the present invention, a method for using a plurality of profiles efficiently may be provided in consideration of a case in which a plurality of profiles of various communication manners and/or various operators are stored in an eUICC.

Also, according to the present invention, when a plurality of profiles of various communication manners and/or various operators are stored in an eUICC, data used commonly by a plurality of profiles among data used by each of the profiles may be managed separately so that the plurality of profiles in the eUICC may be managed efficiently.

Also, according to the present invention, when a plurality of profiles of various communication manners and/or various operators are stored in an eUICC, data used commonly by a plurality of profiles among data used by each of the profiles may be newly defined as a common profile which is a type of profile so that the plurality of profiles in the eUICC may be managed efficiently.

As described above, since the technical idea of the present invention is described by exemplary embodiments, various forms of substitutions, modifications and alterations may be made by those skilled in the art from the above description without departing from essential features of the present invention. Therefore, the embodiments disclosed in the present invention are intended to illustrate the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. An embedded Universal Integrated Circuit Card (eUICC) which is embedded in a terminal and interworks with a Mobile Network Operator (MNO),
   wherein the eUICC includes a common profile which retains common data that is mutually accessible by each of a plurality of profiles;
   wherein for a specific profile from among the plurality of profiles, the eUICC is configured to control access to the common profile based on registering a corresponding profile ID to the common profile and providing, to the specific profile from the common profile, an access parameter; and
   wherein the common profile is in a form of at least one from among an application and a data set.

2. The eUICC of claim 1, wherein the common data include at least one of eUICC identity information and user data.

3. The eUICC of claim 2, wherein the user data include data about at least one of a phonebook and messages.

4. The eUICC of claim 1, wherein the common data include data obtained from a terminal system.

5. A method for managing a plurality of profiles in an embedded Universal Integrated Circuit Card (eUICC) which is embedded in a terminal and interworks with a Mobile Network Operator (MNO), the method comprising:
   a step of loading, by the eUICC, a common profile which retains common data that is mutually accessible by each of a plurality of profiles in the eUICC; and
   a step of updating the common data retained by the common profile when an active profile is loaded; and
   a step of registering a specific profile from among the plurality of profiles as a profile which is authorized to access the common profile by registering a corresponding profile ID to the common profile and providing, to the specific profile from the common profile, an access parameter,
   wherein the common profile is in a form of at least one from among an application and a data set.

6. The method of claim 5, wherein the common data include eUICC identity information.

7. The method of claim 5, wherein, in the step of updating, when the active profile is loaded, the common data retained by the common profile are updated based on at least one of data obtained from a terminal system and user data according to inputs of a user.

8. The method of claim 7, wherein the user data include data about at least one of a phonebook and messages, and the data obtained from the terminal system include location information.

9. The method of claim 5, prior to the step of updating, further comprising:
   a step of loading an active profile changed according to a change of the active profile; and
   a step of updating the common data retained by the common profile based on the data obtained from the terminal system, and maintaining data which can be used after the change of the active profile among the common data existing before the change of the active profile.

10. A method for managing a plurality of profiles in an embedded Universal Integrated Circuit Card (eUICC) which is embedded in a terminal and interworks with a Mobile Network Operator (MNO), the method comprising:
    a step of storing, by the eUICC, a common profile which retains common data that is mutually accessible by each of a plurality of profiles in the eUICC;
    a step of registering a specific profile from among the plurality of profiles as a profile which is authorized to access the common profile by registering a corresponding profile ID to the common profile and providing, to the specific profile from the common profile, an access parameter; and
    a step of accessing, by the eUICC, the common profile in order for the specific profile to use the common data,
    wherein the common profile is in a form of at least one from among an application and a data set.

11. The method of claim 10, wherein the eUICC controls whether the specific profile can access the common profile or not according to the preregistered profile ID in the step of accessing.

12. A terminal providing a communication service by interworking with a Mobile Network Operator (MNO),
    wherein the terminal is configured to embed an embedded Universal Integrated Circuit Card (eUICC) which is configured to store a common profile which retains common data that is mutually accessible by each of a plurality of profiles;
    wherein for a specific profile from among the plurality of profiles, the eUICC is further configured to control access to the common profile based on registering a corresponding profile ID to the common profile and providing, to the specific profile from the common profile, of an access parameter; and
    wherein the common profile is in a form of at least one from among an application and a data set.

13. The terminal of claim 12, wherein the common data include at least one of eUICC identity information and user data.

\* \* \* \* \*